(12) United States Patent
Clark et al.

(10) Patent No.: US 9,069,667 B2
(45) Date of Patent: Jun. 30, 2015

(54) METHOD TO IDENTIFY UNIQUE HOST APPLICATIONS RUNNING WITHIN A STORAGE CONTROLLER

(75) Inventors: Brian D. Clark, Tucson, AZ (US); Juan A. Coronado, Tucson, AZ (US); Beth A. Peterson, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1871 days.

(21) Appl. No.: 12/021,029

(22) Filed: Jan. 28, 2008

(65) Prior Publication Data

US 2009/0193429 A1 Jul. 30, 2009

(51) Int. Cl.
 G06F 3/00 (2006.01)
 G06F 9/44 (2006.01)
 G06F 9/46 (2006.01)
 G06F 13/00 (2006.01)
 G06F 11/07 (2006.01)
 G06F 9/50 (2006.01)

(52) U.S. Cl.
 CPC .......... G06F 11/079 (2013.01); G06F 9/5027 (2013.01); G06F 11/0727 (2013.01); G06F 2209/5013 (2013.01)

(58) Field of Classification Search
 CPC ..................................................... G06F 11/079
 USPC ............................................................ 719/313
 See application file for complete search history.

(56) References Cited

U.S. PATENT DOCUMENTS

| | | |
|---|---|---|
| 6,338,054 B1 * | 1/2002 | Kitamura ........................... 1/1 |
| 7,020,797 B2 | 3/2006 | Patil |
| 7,124,139 B2 | 10/2006 | Nemoto et al. |
| 2004/0193969 A1 * | 9/2004 | Nemoto et al. ............... 714/100 |
| 2006/0026134 A1 | 2/2006 | Takahashi |
| 2006/0064400 A1 | 3/2006 | Tsukerman et al. |
| 2006/0100982 A1 | 5/2006 | Cohn |
| 2007/0011579 A1 | 1/2007 | Suzuki et al. |

* cited by examiner

*Primary Examiner* — Timothy A Mudrick
(74) *Attorney, Agent, or Firm* — William K. Konrad; Konrad Raynes Davda & Victor LLP

(57) ABSTRACT

A method for operating a controller includes receiving a command associated with at least one operation, determining a CPU channel path based on the received command, determining a unique job identifier based on the received command, and determining a state based on the received command. In addition, the method includes updating at least one data matrix based on the determined state, unique job identifier and CPU channel path and operating the controller based on the updated data matrix.

10 Claims, 4 Drawing Sheets

100

200

300

400

500

METHOD TO IDENTIFY UNIQUE HOST APPLICATIONS RUNNING WITHIN A STORAGE CONTROLLER

FIELD OF INVENTION

The present invention generally relates to controllers. More specifically, the invention relates to operating controllers.

BACKGROUND OF THE INVENTION

Controllers play a vital role in allocating computer resources. Thus, controllers often are in a central location, and affect the operation of many program strands. Particularly in larger storage controllers, a failure by the controller can lead to large problems in debugging to prevent further problems.

In a CPU-centric world, applications run in LPARs (z/OS) or hosts (Open). These applications can create either single or multiple jobs which are then used to process I/O to and from storage controllers. There are instances where a job can create an error condition on the storage controller which can then affect all jobs and CPUs accessing that controller. In these cases, it would be advantageous if the particular job could be analyzed to see how it contributed to the creation of the error condition on the storage controller (e.g. malformed command syntax, out of sequence commands, etc). However, in the case where a host or LPAR is running multiple jobs simultaneously, it is not always possible for the "offending" job to be identified from data either on the CPU or the storage controller. While current art allows for the creation and logging of job logs on the CPU, unless the error on the storage controller causes a specific job to fail, it is not possible to identify, from the complete list of jobs, which one created the error condition on the storage controller. It is quite common that even when the storage controller data can point to a particular CPU channel path, IT personnel can not say what jobs are running on that path. Without such ability, debugging and determining the source of the problem can be quite time consuming and expensive, as well as frustrating.

It is therefore a challenge to develop strategies for advancing the art to overcome these, and other, disadvantages.

SUMMARY OF THE INVENTION

One aspect of the present invention is a method for operating a controller that includes receiving a command associated with at least one operation, determining a CPU channel path based on the received command, determining a unique job identifier based on the received command, and determining a state based on the received command. In addition, the method includes updating at least one data matrix based on the determined state, unique job identifier and CPU channel path and then operating the controller based on the updated data matrix.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
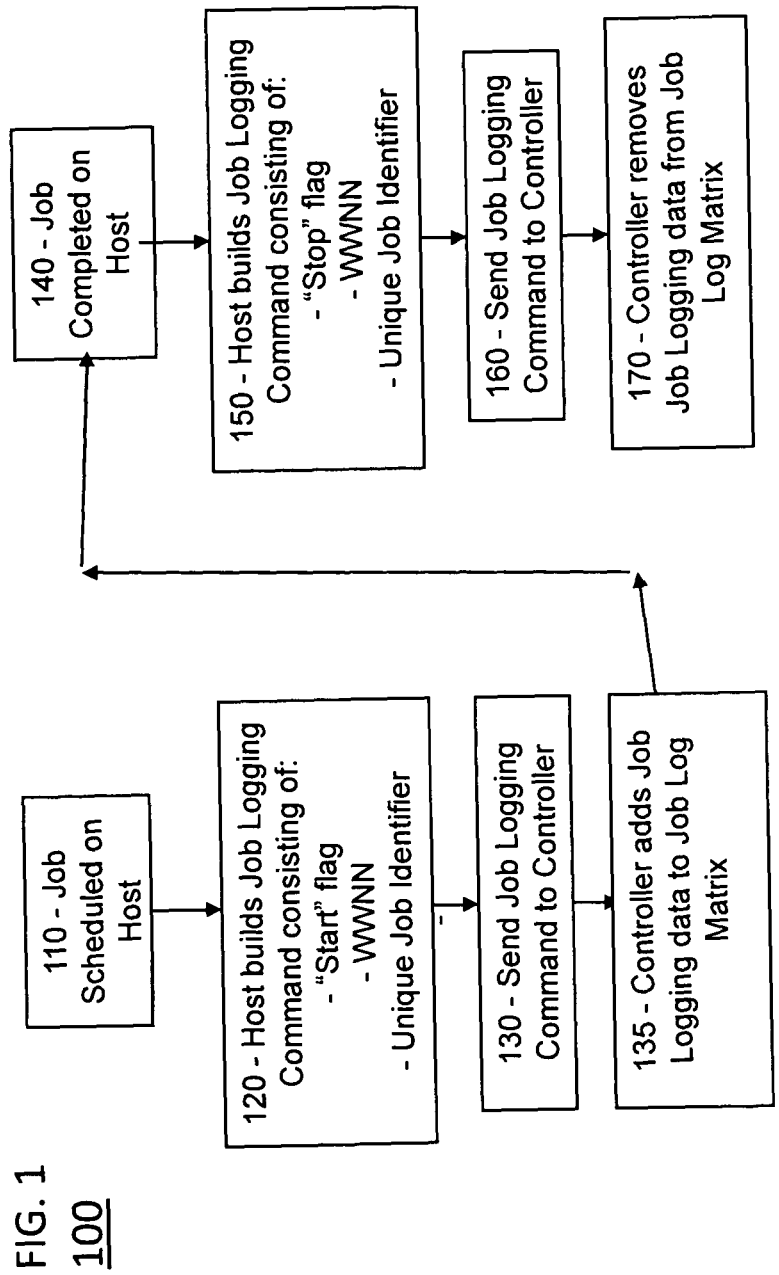
FIG. 1 illustrates one embodiment of a method in accordance with one aspect of the invention.

FIG. 1 illustrates one embodiment of a method 100 for operating a controller in accordance with the invention. Method 100 begins at 110 by scheduling a job on a CPU. The job can be any appropriate usage of computing resources controlled by the CPU. Having received the scheduled job, the CPU builds a job logging command, at step 120, including a status flag indicative of a start status, a Worldwide Node Names ("WWNN") and a unique job identifier. Other data can be included in the job logging command, in addition to these specifically identified data bits. The job logging command is sent at step 130 to the storage controller and at step 135, the storage controller adds the job logging data to the job log matrix. At step 140, the job is completed on the host. Based on completing the job, at step 150, the CPU builds a second job logging command including a status flag indicative of a stop status, the WWNN, and the same unique job identifier previously sent. The new job logging command is sent to the storage controller at step 160, and the storage controller removes the job logging data from the job log matrix at step 170. In such a fashion, the job log matrix includes a list of only the jobs executing on the storage controller at any particular point in time, accurately indicating the possible sources for any controller errors.

Figure 2:
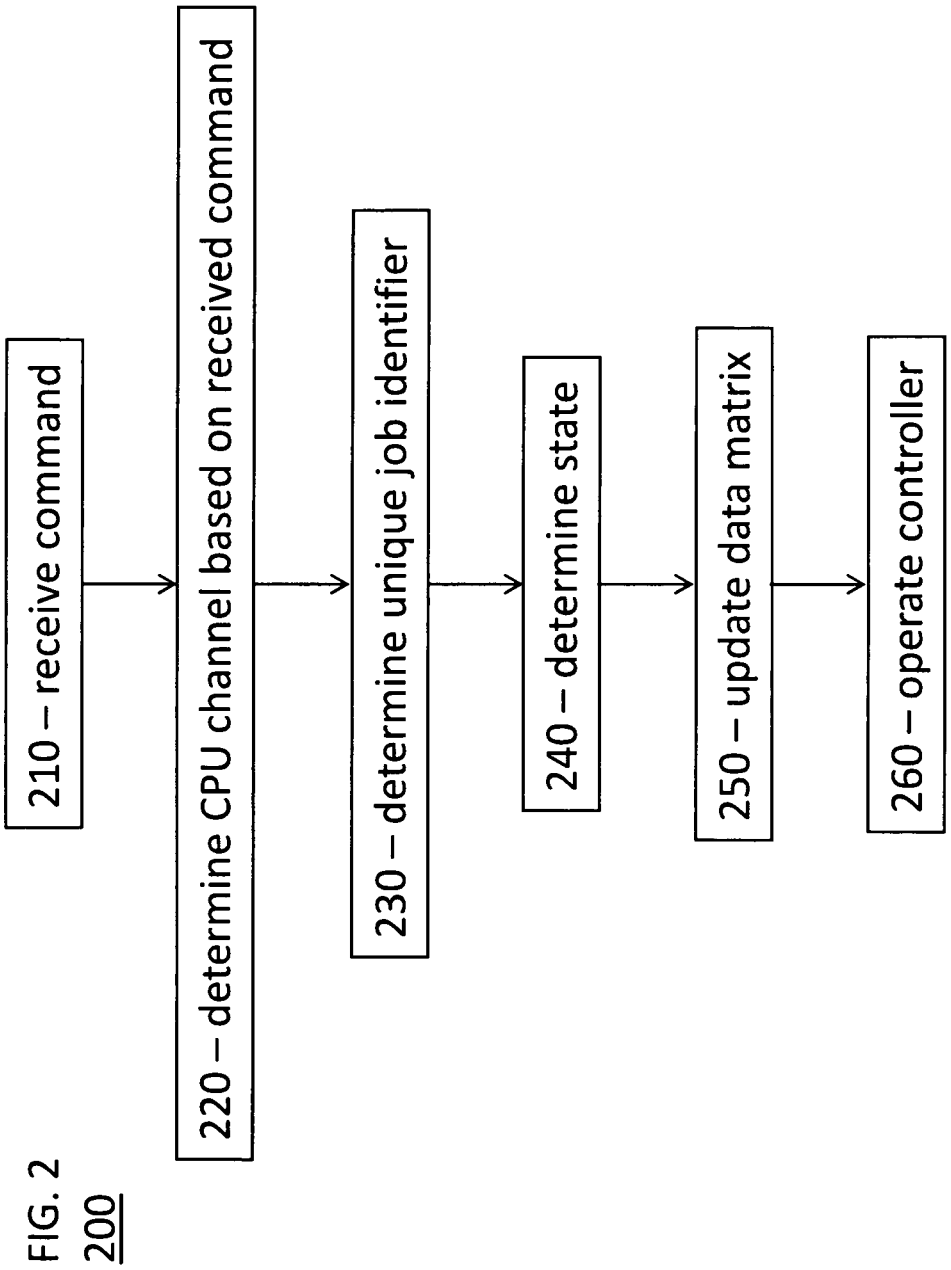
FIG. 2 illustrates one embodiment of method in accordance with one aspect of the invention.

FIG. 2 illustrates another embodiment of a method 200 for operating a controller in accordance with another aspect of the invention. At step 210, a command associated with at least one operation is received at a central location, such as a controller or host. In one embodiment, the command is received from a CPU. The command requires utilization of a scarce resource, or a resource with limited availability such as CPU cycles, controller cycles, memory utilization or the like. The operation can be any computing operation such as calculation or manipulation of data.

At step 220, a CPU channel path is determined based on the received command. The CPU channel path, in one embodiment, includes WWNN information. A unique job identifier is determined based on the received command at step 230, and a state of the command is determined at step 240. The unique job identifier is any unique data to uniquely identify the job. The unique job identifier can include any number of bits, B, wherein B is an integer ≥1, sufficient to ensure that no currently operating jobs share the same unique job identifier. The unique job identifier, in one embodiment, further includes information associated with the date and/or time of the job. The state of the operating job can be any state, including start, stop, executing, paused, error, or the like. In one embodiment, the state is a binary variable between a "start" state and a "stop" state.

A data matrix is updated based on the determined CPU channel path, status, and unique job identifier at step 250. The data matrix is any data structure, such as a database or chart, listing each job currently executing on the storage controller. The storage controller is then operated based on the updated data matrix at step 260. In the event of a failure, the universe of possible jobs that caused the failure is therefore culled from the universe of all applications that use the storage controller to those applications that were actually using the storage controller at the time of the failure.

Figures 3, 4:
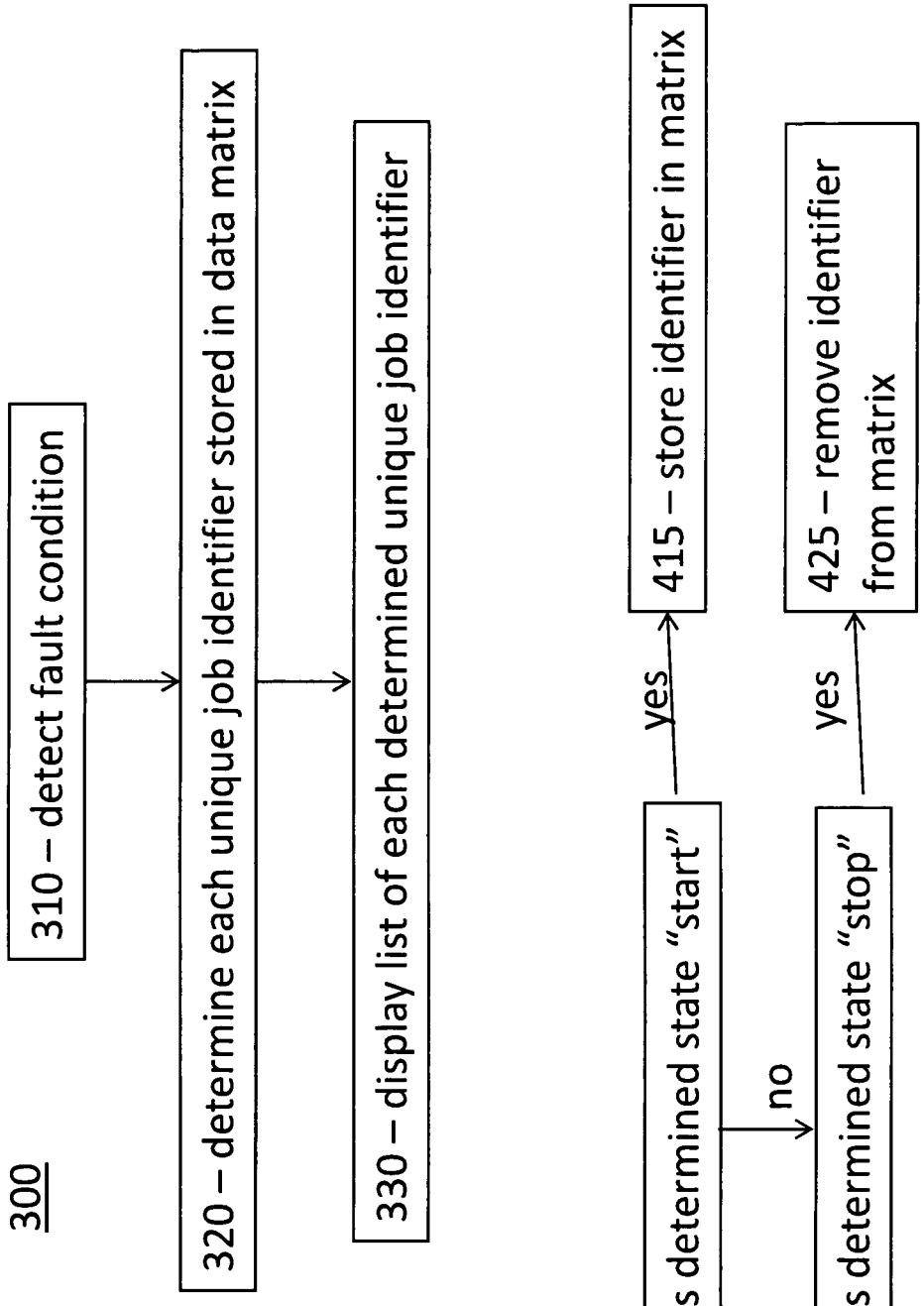
FIG. 3 illustrates one embodiment of a method in accordance with one aspect of the invention.
FIG. 4 illustrates another embodiment of a method in accordance with one aspect of the invention.

FIG. 3 illustrates one embodiment of a method 300 for operating the storage controller in accordance with one aspect of the invention. Method 300 begins at 310 by detecting a fault condition. The fault condition can be any error and can be detected using any appropriate technique known. Based on detecting the fault condition, method 300 determines, at step 320, each unique job identifier stored in the data matrix, and displays the determined unique job identifiers at step 330. In various embodiments, the matrix can be retrieved on detection of the fault condition using appropriate techniques, including statesave, snapshot, or backup techniques. Displaying can include generating a list, displaying the list on an appropriate device such as a monitor, file, or paper, or any other technique for providing the data to a system operator.

FIG. 4 illustrates one embodiment of a method 400 for updating at least one data matrix when the determined state is one of a start and stop state in accordance with one aspect of the invention. At step 410, method 400 determines whether the determined state is "start", and if yes, at step 415 stores the unique job identifier and CPU channel associated with the command that included the determined state in the matrix. If no, at step 420, method 400 determines whether the state is stop, and if yes, at step 425 removes the unique job identifier and CPU channel from the matrix.

Figure 5:
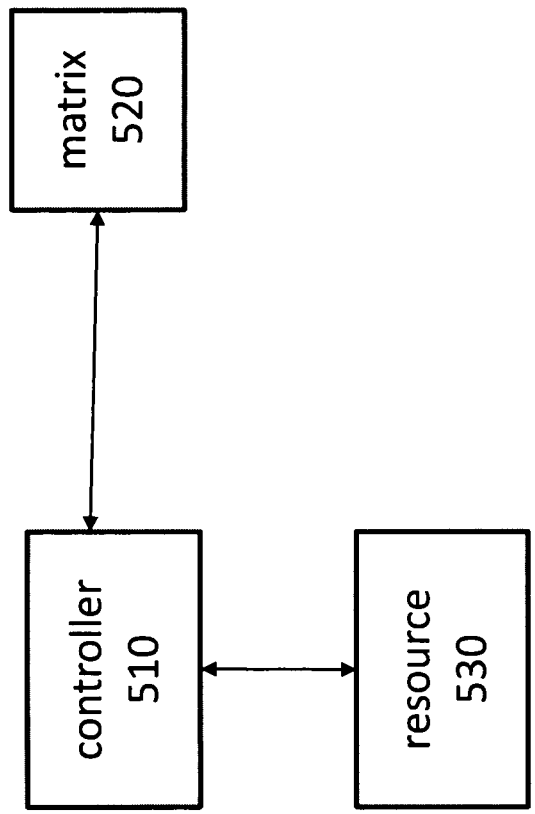
FIG. 5 illustrates one embodiment of a system 500 in accordance with one aspect of the invention.

FIG. 5 illustrates one embodiment of a system 500 in accordance with one aspect of the invention. System 500 includes a controller 510 in communication with a job matrix 520 and a scarce resource 530. The scarce resource 530 can include a CPU or other such computing resource. The job matrix 520 stores information related to operations of the scarce resource 530. The system can be implemented in any computing device. Controller 510 includes persistent memory including computer readable code for executing the method steps described above, with reference to method 200, method 300, and method 400.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method for operating a controller, the method comprising:
    receiving a command associated with at least one operation;
    determining a CPU channel path based on the received command;
    determining a unique job identifier based on the received command;
    determining a state based on the received command;
    updating at least one data matrix based on the determined state, unique job identifier and CPU channel path; and
    operating the controller based on the updated data matrix wherein operating the controller based on the updated data matrix comprises: detecting at least one job-caused fault condition wherein one or more of the received commands of a job which caused the detected fault condition is the source of the detected fault condition; determining each unique job identifier stored within the data matrix based on the detected job-caused fault condition; and displaying a list of each determined unique job identifier based on the determination.

2. The method of claim 1, wherein the determined state is one of start and stop, and wherein updating at least one data matrix comprises: when the determined state is start, storing the unique job identifier and CPU channel path in the matrix; and when the determined state is stop, removing the stored unique job identifier and CPU channel path from the matrix.

3. A computer readable medium including a persistent memory, storing a computer program of machine-readable instructions executable by a processor to perform operations to operate a controller, the instructions comprising:
    computer readable code for receiving a command associated with at least one operation;
    computer readable code for determining a CPU channel path based on the received command;
    computer readable code for determining a unique job identifier based on the received command;
    computer readable code for determining a state based on the received command;
    computer readable code for updating at least one data matrix based on the determined state, unique job identifier and CPU channel path; and
    computer readable code for operating the controller based on the updated data matrix wherein computer readable code for operating the controller based on the updated data matrix comprises: computer readable code for detecting at least one job-caused fault condition wherein one or more of the received commands of a job which caused the detected fault condition is the source of the detected fault condition; computer readable code for determining each unique job identifier stored within the data matrix based on the detected job-caused fault condition; and computer readable code for displaying a list of each determined unique job identifier based on the determination.

4. The medium of claim 3, wherein the determined state is one of start and stop, and wherein computer readable code for updating at least one data matrix comprises: when the determined state is start, computer readable code for storing the unique job identifier and CPU channel path in the matrix; and when the determined state is stop, computer readable code for removing the stored unique job identifier and CPU channel path from the matrix.

5. A controller comprising:
    a persistent memory, the memory including machine-readable instructions executable by a processor to perform operations to operate a controller, the instructions comprising:
    computer readable code for receiving a command associated with at least one operation;
    computer readable code for determining a CPU channel path based on the received command;
    computer readable code for determining a unique job identifier based on the received command;
    computer readable code for determining a state based on the received command;
    computer readable code for updating at least one data matrix based on the determined state, unique job identifier and CPU channel path; and
    computer readable code for operating the controller based on the updated data matrix wherein computer readable code for operating the controller based on the updated data matrix comprises: computer readable code for detecting at least one job-caused fault condition wherein one or more of the received commands of a job which caused the detected fault condition is the source of the detected fault condition; computer readable code for determining each unique job identifier stored within the data matrix based on the detected job-caused fault condition; and computer readable code for displaying a list of each determined unique job identifier based on the determination.

6. The controller of claim 5, wherein the determined state is one of start and stop, and wherein computer readable code for updating at least one data matrix comprises: when the determined state is start, computer readable code for storing the unique job identifier and CPU channel path in the matrix; and when the determined state is stop, computer readable code for removing the stored unique job identifier and CPU channel path from the matrix.

7. A method for operating a controller, the method comprising:
   receiving a command associated with at least one operation;
   receiving a CPU channel path based on the received command;
   receiving a unique job identifier based on the received command;
   receiving a state based on the received command;
   updating at least one data matrix based on the received state, unique job identifier and CPU channel path; and
   operating the controller based on the updated data matrix wherein operating the controller based on the updated data matrix comprises: detecting at least one job-caused fault condition wherein one or more of the received commands of a job which caused the detected fault condition is the source of the detected fault condition; determining each unique job identifier stored within the data matrix based on the detected job-caused fault condition; and displaying a list of each determined unique job identifier based on the determination.

8. The method of claim 7, wherein the received state is one of start and stop, and wherein updating at least one data matrix comprises: when the received state is start, storing the unique job identifier and CPU channel path in the matrix; and when the received state is stop, removing the stored unique job identifier and CPU channel path from the matrix.

9. The method of claim 7 wherein a command having malformed command syntax is the source of the detected fault condition.

10. The method of claim 7 wherein out of sequence commands of a job which caused the detected fault condition, are the source of the detected fault condition.

* * * * *